March 24, 1959
H. HANSEN, JR
2,878,902
EMERGENCY BRAKE
Filed Feb. 25, 1957
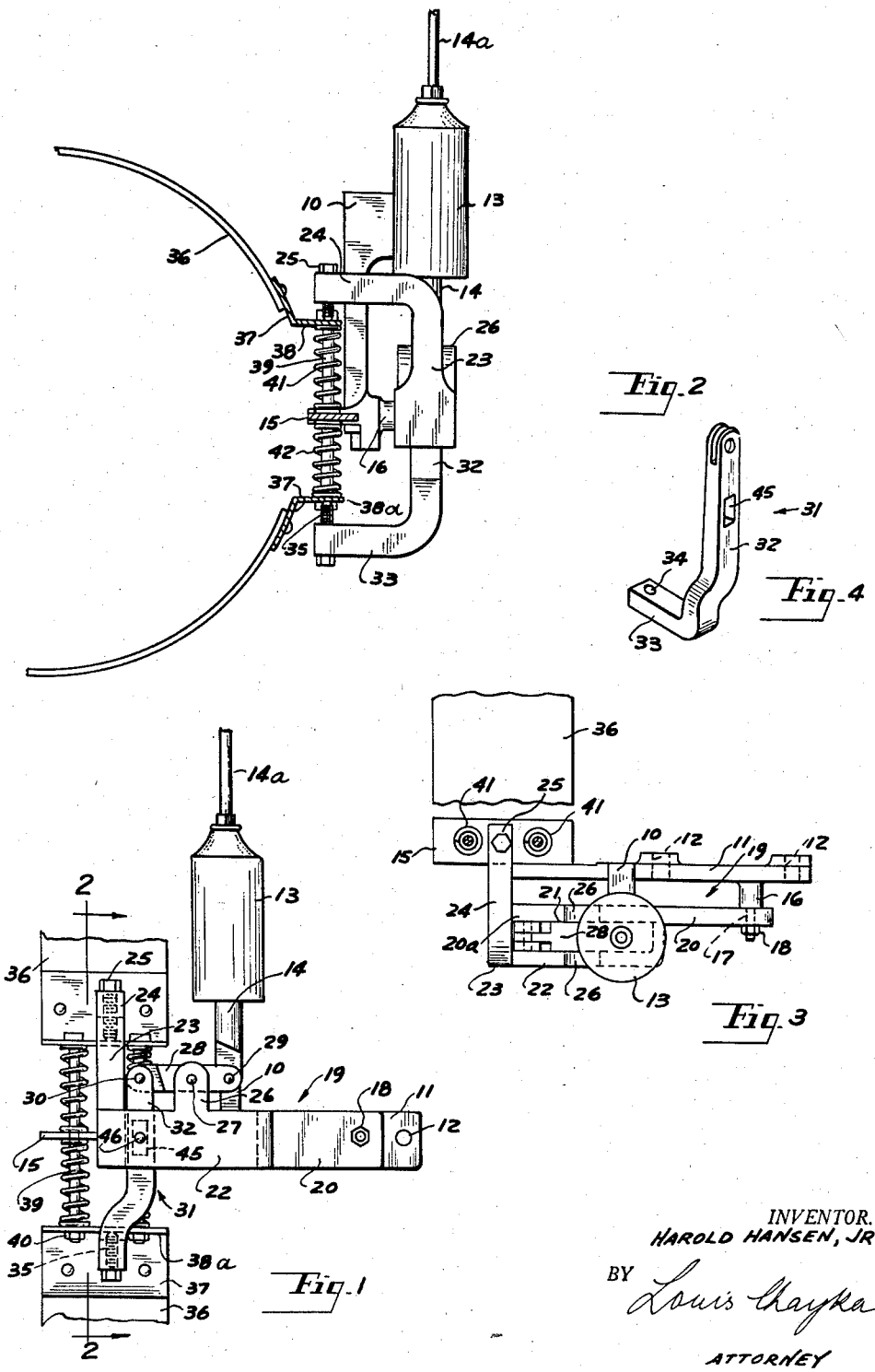
INVENTOR.
HAROLD HANSEN, JR.
BY Louis Chayka
ATTORNEY

United States Patent Office 2,878,902
Patented Mar. 24, 1959

2,878,902

EMERGENCY BRAKE

Harold Hansen, Jr., L'Anse, Mich., assignor of fifty percent to Stella Hansen, L'Anse, and fifty percent to Anna E. Utsler, Detroit, Mich.

Application February 25, 1957, Serial No. 641,948

3 Claims. (Cl. 188—77)

My invention pertains to a brake of the type known as the external contraction brake, and of the type to be operated by a fluid medium such as oil under pressure.

The object of the invention is to provide a brake including a mechanism which will be instantaneously responsive to the means controlling the operation thereof, and which will supply sufficiently ample power for the effective use of the braking means.

A further object of the invention is to provide a mechanism of a simple structural design and yet fully practical, reliable, and efficient.

I shall now describe my improvement with reference to the accompanying drawings in which:

Fig. 1 is a side elevational view of the brake mechanism as employed in combination with a brake band;

Fig. 2 is a view taken on line 2—2 of Fig. 1;

Fig. 3 is a top elevational view of the said mechanism;

Fig. 4 is a perspective view of an element of said mechanism.

Similar numerals refer to similar parts throughout the several views.

The mechanism includes a vertical stand 10, forming a part of a horizontally disposed bracket 11, which is provided with a plurality of holes 12 for application of bolts by means of which the bracket may be mounted upon a stationary member of the framework of the vehicle in which the mechanism is to be used.

At the top, the stand supports a hydraulic cylinder 13 which, by a means of a pipe 14a is connected to a master cylinder which is not shown and from which oil or a similar fluid medium is delivered to said cylinder 13. A rod 14 disposed axially within said cylinder 13 is adapted to be forced outwardly from said cylinder 13 in response to the pressure of the fluid medium within said cylinder.

Secured to one end of the bracket 11, is a horizontal plate 15 to which I shall refer again. At the opposite end, the bracket 11 is provided with an integrally formed boss 16 extending at right angle therefrom as best shown in Fig. 3.

Pivotally connected to the boss by means of a pin 17 and secured against displacement by a nut 18, which is threaded upon said pin, is an oblong member generally identified by numeral 19. One end portion of said member consists of a single bar 20, and it is the outer end of said bar that is pivotally connected to the bracket 11 as described above, the bar being disposed substantially parallel to it and being spaced therefrom as best shown in said Fig. 3.

The opposite end portion of the member 19 is expanded laterally as seen with reference to said bracket 11, and is provided with a vertical slot 21, the space within the slot being in part defined by an extended portion 20a of the bar 20, and by a parallel member 22. Mounted upon said member 19, at the end remote from its pivotal connection to the bracket 11, is a vertical crane like standard 23, the standard including, at the top, a horizontal arm 24, which at its outer end is provided with a vertical, threaded bore for reception of a screw 25. Each of the above named members 20a and 22, includes an integrally formed pillow block 26. Each of the blocks contains a bearing for a pin 27, said pin being held at its ends in said bearings and being disposed transversely within said slot 21. Fulcrumed upon said pin, as shown in Fig. 1, is a short beam 28 which at one end is pivotally connected, as shown at 29, to the lower end of the above described rod 14.

Pivotally connected to the beam 28 at the other end as shown at 30, is a vertically disposed link, generally marked 31. The link includes a vertical portion 32, passing through the slot 21 downwardly, and a horizontal portion 33 bent at right angle from said portion 32. The outer end of the horizontal portion is provided with a vertical threaded bore 34 for reception of a screw 35. The screw is axially alined with the screw 25 threaded into the horizontal arm 24 of the standard 23.

The brake band which the mechanism is applied to, is marked 36, the band being of the type customarily used in auto vehicles for engagement with a brake drum which is not shown. Bolted to one end of the band is a rigid member 37 which includes a flat tab 38 extending substantially radially therefrom. A similar tab at the other end of the band is marked 38a. Each tab which is preferably of the same width as the band itself contains two holes spaced from each other on a line transversely to the length of the band. Similarly the horizontal plate 15, which is a part of the bracket 11, is also provided with two such holes and it is by means of said tabs and said plate 15 that the brake band is operatively connected to the mechanism devised by me. More specifically the connection is effected by means of said tabs, said plate 15, and of two bolts 39. Each bolt is inserted through a hole in the upper tab, through a corresponding hole in the plate 15, and through a corresponding hole in the lower tab 38a whereupon it is secured against displacement by a nut 40, which is threaded upon the lower end of the bolt under the lower surface of the tab 38a. The holes in the tabs are large enough to permit free movement of the tabs with relation to the respective bolts.

Coiled about each bolt, and disposed between the plate 15 and the upper tab, is a spring 41. Similar springs coiled about each of the bolts under the plate 15 are marked 42. The springs, bearing from the direction of the plate against the two tabs, serve to keep them in mutally diverging positions.

While the tabs 38 are held in their respective positions by said bolts 39, the screw 25 in the horizontal arm 24 of the stand 23 will bear against the upper tab 38, while the screw 35 in the horizontal portion 33 of the member 31 will bear against the lower tab 38a from below.

To complete the description of the mechanism, I wish to add that said member 31 is provided with a slot 45 in its vertical portion 32, and that a transverse pin 46 in the slot 21 in said member 19 projects into said slot 45, as shown in Fig. 1, and serves as a means to limit the vertical movement of said member 31.

At this point I wish to point out that normally the coiled springs 41 and 42 hold the brake band in its expanded or loose relation to the brake drum which the band encircles. Furthermore I wish to add that admission of oil or some other fluid medium from the master cylinder to the cylinder 13 is controlled by a valve which is not shown, but which may be operated by a lever or other equivalent means.

Assuming now that the emergency brake is to be operated, the mechanism will operate as follows:

The valve controlling admission of fluid from the master cylinder to cylinder 13 has to be opened. This, as pointed out above, may be brought about by a lever, adapted to be actuated manually. Actuated by pressure of the fluid, the rod 14 will move outwardly. Since the rod is connected by means of the beam 28 to the member 19, said member will be swung downwardly from its pivotal connection at 18 to the stationary bracket 11. The standard 23, mounted at the opposite end of said member, will be lowered. The screw 25 in the horizontal arm 24 of the standard will force the upper tab 38 towards the opposite or the lower tab 38a. As the beam 28, which is fulcrumed midway its length as shown at 27, is connected at its end, remote from the rod 14, to the vertical link 31, the downward movement of the rod 34 will effect an upward movement of the link 31. As a result, the screw 35 bearing against the underside of the lower tab 38a will force it upwardly towards the upper tab 38, thus causing the brake band to grip the outer surface of the brake drum.

On release of the pressure against the rod 14, which will take place on closing the valve in the pipe 14a which leads from the master cylinder to cylinder 13, springs 41 and 42 will spread the tabs 38 and 38a outwardly from each other, thus expanding the brake band and releasing its grip upon said brake drum.

It will be understood that some changes may be made in the structure of the mechanism described by me without departing beyond the range of the inventive concept disclosed herein.

After having described my improvement, what I wish to claim is as follows:

1. In combination with a brake band embracing a brake drum and having two ends, each of which is provided with a rigid, radially disposed tab, in a parallel spaced relation to the other, a stationary bracket, including a flat plate extending into the space between said two tabs, said plate and said tabs being each provided with a plurality of holes, the holes in the plate being in alinement with similar holes in the respective tabs, a plurality of bolts passing through said plate, each of the bolts passing also through the alined holes in the two tabs, coiled springs on said bolts to keep the tabs in a normally spread relation from each other, an oblong member at one end pivotally connected to said bracket, a standard at the other end, the standard including a transverse arm in a spaced parallel relation to one of the tabs, a screw threaded through said arm and bearing against the tab in the direction of the opposite tab, a beam fulcrumed midway its length upon said oblong member, a link extending from one arm of the beam and including a portion disposed in a parallel and spaced relation to the other tab and a screw threaded through said portion and bearing against the tab in the direction of the opposite tab, and a hydraulic cylinder mounted upon the bracket and including an axially disposed rod adapted to be moved outwardly by pressure of a fluid medium, the outer end of the rod being pivotally connected to the other arm of the beam to pivot both said oblong member and said beam whereby to bring the tabs together for braking engagement of the brake band with said drum.

2. In combination with a brake band embracing a brake drum, and having two ends, each of which terminates with a radially disposed tab in a spaced and substantially parallel relation to the other tab, each tab being provided with two holes spaced from each other, the holes in one tab being alined with the holes in the other tab, an oblong stationary bracket including a plate extending into the space between the two tabs and disposed parallel thereto, the plate being provided with two holes in alinement with the holes in the tabs, a stand extending from the bracket at right angle thereto, a hydraulic cylinder mounted upon said stand and including an axial rod adapted to be forced outwardly from the cylinder by a fluid medium under pressure, an oblong member at one end pivotally connected to said bracket, and including a standard at its other end, the standard including an arm disposed parallel to one tab, means projecting from the arm against the tab and bearing against the tab in the direction of the opposite tab, a beam pivotally mounted midway its length upon said oblong member, one end of the beam being pivotally connected to the outer end of the rod, the other end of the beam being pivotally connected to a link extending in the direction opposite to that of the standard, the link including a portion disposed parallel to the last named tab, and means projecting from said portion and bearing against said tab in the direction of the first named tab, and two bolts passing through the respective holes in the tabs and in the plate therebetween, the tabs being in a sliding relation to said bolts, and springs coiled about the bolts to keep the tabs in a normally diverging position from each other, said rod serving to pivot both said oblong member and said beam whereby to bring the tabs together for braking engagement of the brake band with said drum.

3. In combination with a brake band having two end tabs in a spaced, parallel relation to each other, a stationary bracket including a plate extending into the space between the two tabs, the tabs and the plate being each provided with two holes, the holes in the plate being alined with the holes in the tabs, a bolt disposed in each of the holes of the plate and passing through the alined holes in both tabs to limit the outward movement of the tabs from each other, a spring coiled about each bolt between the plate and the respective tab to keep the tabs in a yieldingly expanded relation to each other, an oblong member at one end pivotally connected to the bracket and having within the other end a slot in a direction at right angle to the face of the plate, said member including a portion disposed in a parallel spaced relation to one tab on the side remote from the plate, and a screw extending from that portion and bearing against said tab, a hydraulic cylinder supported by said bracket and including a rod adapted to be forced outwardly from the cylinder by a fluid medium under pressure, a beam mounted pivotally midway its length within said slot, one end of the beam being pivotally connected to said rod, the other end of the beam being pivotally connected to one end of a link extending from said slot, the link including a portion disposed parallel to the other tab on the side removed from the plate, and a screw extending from said last named portion and bearing against said tab, said rod serving to pivot both said oblong member and said beam whereby to bring the tabs together for braking engagement of the brake band with said drum.

References Cited in the file of this patent
UNITED STATES PATENTS

| | | |
|---|---|---|
| 749,932 | Hill | Jan. 19, 1904 |
| 752,881 | Ball | Feb. 23, 1904 |
| 772,730 | Morgan | Oct. 18, 1904 |
| 1,334,754 | Roberts | Mar. 23, 1920 |
| 2,660,264 | Richardson | Nov. 24, 1953 |